July 31, 1956    J. HINSKEN ET AL    2,756,689
CHASSIS OR GUIDING FRAME FOR VEHICLES RUNNING ON RAILS
Filed Jan. 10, 1952    2 Sheets-Sheet 1
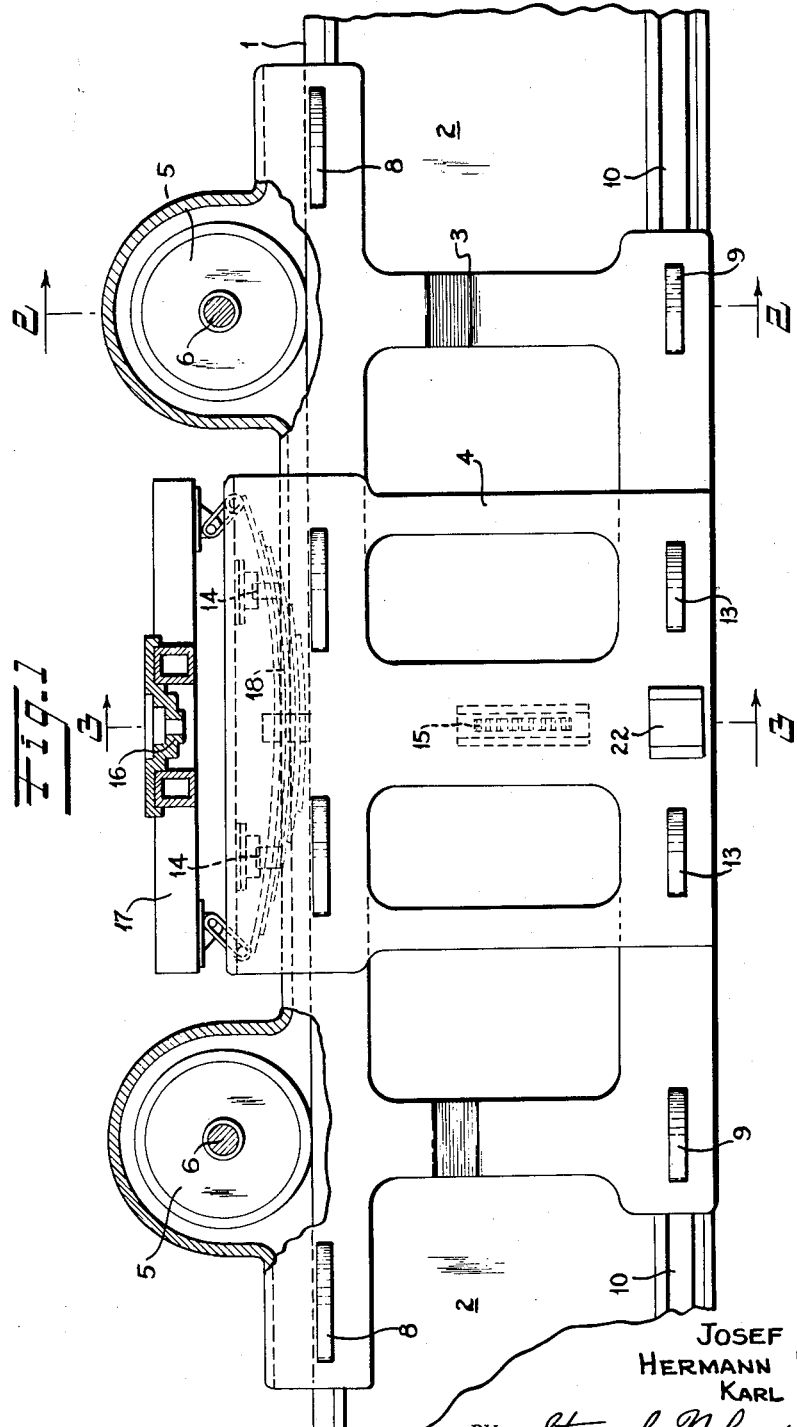
INVENTORS
JOSEF HINSKEN
HERMANN BARTHELMESS
KARL MEYER
BY Strauch, Nolan & Diggins
ATTORNEYS July 31, 1956   J. HINSKEN ET AL   2,756,689
CHASSIS OR GUIDING FRAME FOR VEHICLES RUNNING ON RAILS
Filed Jan. 10, 1952   2 Sheets-Sheet 2
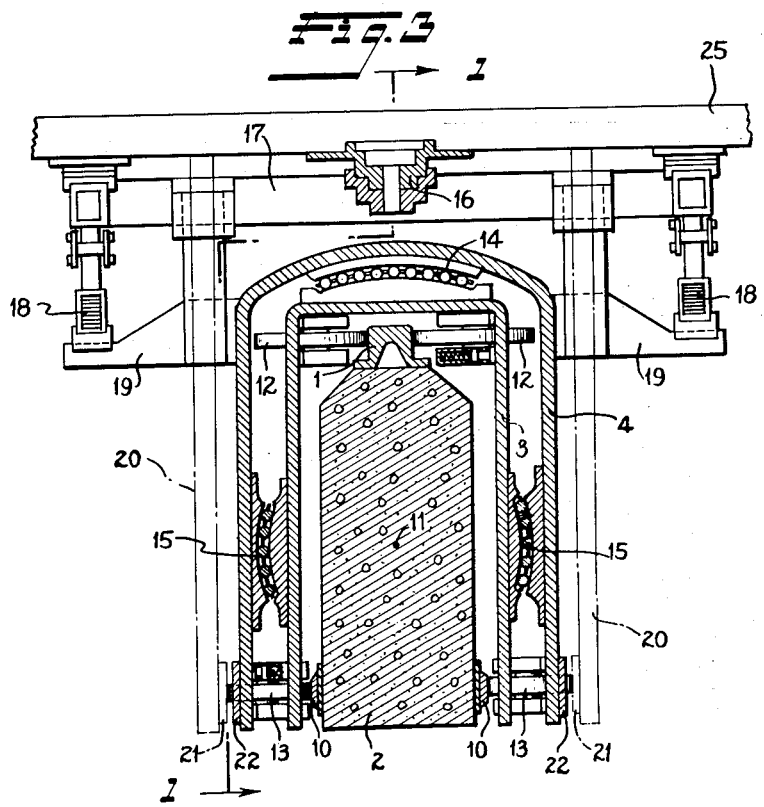
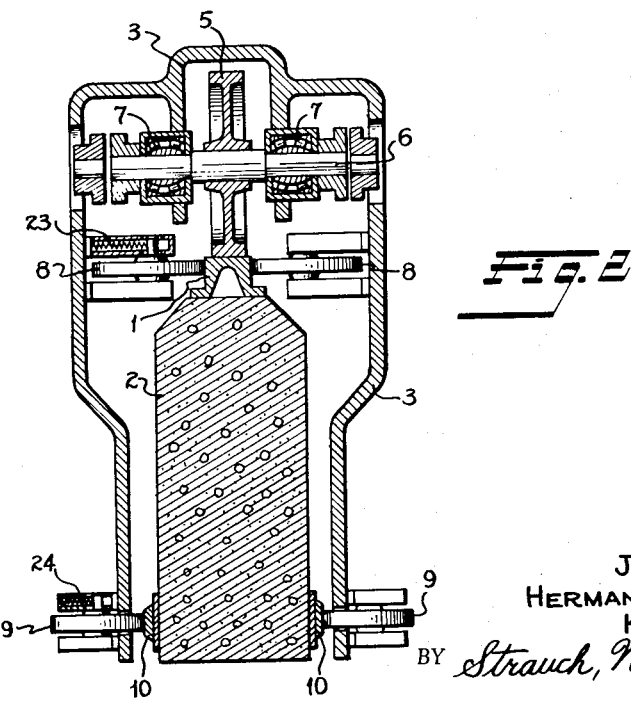
INVENTORS
JOSEF HINSKEN
HERMANN BARTHELMESS
KARL MEYER
BY *Strauch, Nolan & Diggins*
ATTORNEYS

United States Patent Office 2,756,689
Patented July 31, 1956

2,756,689

CHASSIS OR GUIDING FRAME FOR VEHICLES RUNNING ON RAILS

Josef Hinsken, Koln-Merheim, Hermann Barthelmess, Furstenfeldbruck, near Munich, and Karl Meyer, Opladen, Germany, assignors, by mesne assignments, to Alweg-Forschung, Gesellschaft mit beschrankter Haftung, Koln, Germany Application January 10, 1952, Serial No. 265,892

15 Claims. (Cl. 105—145)

The present invention relates to a chassis or guiding frame for vehicles running on beams, preferably mono-beam railways.

Mono-beam vehicles as well as double-rail vehicles require a possibly favourable guide in operation. In the double-rail vehicle art it has been tried to achieve said most desirable feature by means of bogies or trucks which are commonly loaded by both the normal and the tilting forces acting upon a single member.

Said prior art system is disadvantageous inasmuch as it does not permit an accurate determination of the magnitude of the forces which are essential to determine the dimensions of the component parts to assure maximum strength and minimum weight. Moreover, in operation, difficulties have arisen as to smooth and secure running.

It is, therefore, an object of the instant invention to provide a chassis or guiding frame for vehicles running on beams in which the actions of the forces are clearly to survey and fairly to determine in detail as to static points of view so as to enable reliable designing of the component parts and to ensure distinct operating conditions.

It is another object of the invention to provide a chassis or guiding frame for vehicles running on beams which is adapted to resolve or decompose the forces to be transferred from the vehicle to the supporting system so that each kind of force is separatedly taken up and transferred.

A further object of the invention resides in the provision of a chassis or guiding frame for vehicles running on rails in which frame members being independent of one another as to the transmission of power are adapted to take up the normal and tilting force of the vehicle, respectively, and to separately transfer the latter to the rail and thence to its foundation or supporting substructure.

While some of the more salient objects, features, and advantages of the instant invention have been above pointed out, others will become apparent from the following disclosures, taken in conjunction with the accompanying drawings, in which Fig. 1 shows a side elevational view of an embodiment of the chassis or guiding frame for mono-beam vehicles in accordance with the invention;

Fig. 2 is a vertical sectional view taken on the line II—II of Fig. 1; and

Fig. 3 is a vertical sectional view taken on the line III—III of Fig. 1.

Referring now to the drawings, wherein similar reference numerals are employed to designate the same parts throughout the description and the several views, the guiding frame according to the invention, which runs on a mono-beam assembly 2 having a top rail 1, substantially comprises a frame member 3, the so-called supporting saddle, adapted to take up the normal forces acting on the vehicle, and another frame member 4, the so-called tipping or tilting saddle, adapted to merely take up the tilting forces acting on the vehicle. The tilting saddle may preferably embrace the supporting saddle like a rider.

In the supporting saddle 3 there are fixedly supported two or more bearing or running wheels 5 mounted on an axle 6, which is supported at both ends in roller or plain bearings 7 and arranged to be directly driven by electric motors, not shown, so as to move the vehicle or carriage. Besides, the supporting saddle 3 is guided by means of lateral supporting members, such as for instance guide rolls 8. The running wheels 5 only transfer the loads normally acting on the rail 1. This is obtained by rigidly supporting the bearing or running wheels 5 in the supporting saddle 3 and by accurately guiding the latter by means of guide rolls 8. It is preferred to locate the upper guide rolls 8 in pairs at both sides of the rail within the supporting saddle so as to act as rolls running before and behind the wheels, respectively. The upper guide rolls 8 are urged against the vertical surfaces of the rail 1 by means of springs 23 so that they in any case securely roll along said surfaces without sliding or slipping. Any deviation of the running wheels from the predetermined running direction in straight sections or especially in curves is compensated by said guide rolls which make effective the elastic forces being applied to the guiding rolls to an increased degree, thus automatically urging back the supporting saddle into its proper position. Other guide rolls 9 likewise mounted in pairs at both sides of the mono-beam assembly 2 have their axis below the axle of the bearing wheels 5 whereby they likewise under elastic pressure action by springs 24 roll along upon lower lateral rails 10. Said guide rolls 9 have the object to constantly hold the supporting saddle 3 and thence the bearing or running wheels 5 centrally upon the mono-beam 2, thus causing the normal loads to be taken up by the bearing wheels 5. The rail 1 may have any suitable section. It is preferred, however, to use a rail having a plain running face in accordance with the plain face of the bearing wheels 5.

The supporting saddle 3 carries the tilting saddle 4 positioned in the middle of the distance intermediate the two bearing or running wheels 5. The tilting saddle 4 which transfers all forces arising from the vehicle body is pivoted about a center of motion 11 and guided by lateral supporting members, such as for instance guide rolls 12, 13, which are fully independent of the guide of the supporting saddle 3. It is preferred to position the center of motion 11 approximately in half height distance between the upper guide rolls 12 and the lower guide rolls 13. Segment bearings 14 and 15 the radius of which is determined by the center of motion 11 enable the tilting saddle to be swivelled. The normal forces are transmitted to the supporting saddle 3 by means of the segment bearings 14, 15, whereas the tilting moments exert no action thereto. The segment bearings may preferably be supplemented by interposing sliding rolls or balls. The guide rolls 12, 13 being symmetrically mounted with respect to the transversal axis of the tilting saddle roll along the same tracks or runway faces as the guide rolls 8, 9 of the supporting saddle. Said guide rolls 12, 13 are likewise loaded by elastic pressure which if the tilting saddle swivels will vary so that the elasticity will react against the active tilting moment to absorb it.

The normal loads of the load-carrying part 25 of the carriage of the vehicle body, are transferred to the tilting saddle through both a center pin socket 16 mounted above the center of the tilting saddle and a swing bolster device. The latter being of common type may comprise, for instance, a plate 17 which supports the center pin socket 16 and loads projecting arms 19 at both ends through spring assemblies 18, said projecting arms 19 being fixedly secured to the tilting saddle 4.

Moreover, it is arranged that swivelling motions or tilting moments of the load-carrying carriage part of the vehicle body, directly act upon the tilting saddle.

This is achieved by means of vertical cross-bars 20 fastened to the carriage body so as to extend until below the center of motion 11, preferably down to the guide rolls 13. The end portions of the cross-bars are provided with slide blocks 21 facing adequate slide blocks 22 attached to the tilting saddle. A suitable clearance may be provided intermediate the two slide blocks 21 and 22. If swivelled by tilting moments the vehicle body will transfer this movement by means of the slide blocks 21 and 22 without any special spring member. Then the tilting forces are transferred directly to the rail support 2 through guide rolls mounted on springs. Thus it is possible to transfer the tilting moment of the vehicle body to the tilting saddle below its center of motion by means of said slide blocks.

Instead of using guide rolls 8, 9, 12, 13 it is alternatively possible to employ skids or any other suitable members. If necessary, several tilting saddles may be used.

The systematic resolution of the acting forces into both normal loads and tilting moments does not yet involve the transmission of the real component forces. That is obtained by a corresponding transmission of forces to the several springs mounted on the guide rolls of the supporting and tilting saddles respectively, in accordance with the spring power contacts used. Thus all kinds of forces being effective in a mono-beam railway system are unequivocally distributed to the structural members of the guiding frame. The resiliencies and operating strokes of all springs are exactly dimensioned with consideration to the loads as well as to each other so as to obtain a good running operation and sufficient equilibration of the vehicle. The guiding frame according to the invention which includes the resolution of the acting forces to the several structural members of the guiding frame is not only useful in mono-beam operation, but can also be successfully employed in double-rail track systems. The invention provides a guiding frame in which the actions of forces with respect to the several component parts can be clearly determined as to static points of view, thus enabling the several structural members to be rated according to the real strains. It is ensured that certain parts are loaded by pre-determined forces only, whereby an unobjectionable construction is obtained. The guiding frame in accordance with the invention ensures a smooth and safe running operation of vehicles running on rails even under the most desirable high velocities causing considerably increased forces.

It will, of course, be understood that various details of construction may be varied through a wide range without departing from the principles of this invention and it is, therefore, not the purpose to limit the patent granted hereon otherwise than necessitated by the scope of the appended claims.

We claim:

1. Guiding and carrying means for vehicles adapted to run on a beam assembly, said means comprising an elongated carrying saddle of inverted U-shape and having spaced opposed depending side walls and a connecting top portion to receive said beam assembly therebetween, longitudinally spaced bearing means on said saddle, running wheels rotatably mounted in said bearing means, guide rollers mounted rotatably on each of said side walls, respectively, and disposed adjacent the upper ends thereof to engage said beam assembly, tilt rollers rotatably mounted on each of said side walls, respectively, and disposed adjacent the lower ends thereof and adapted to engage the sides of said beam assembly, a tilting saddle seated astride said carrying saddle and intermediate its spaced running wheels, said tilt saddle being of inverted U-shape and having depending side walls and a connecting top portion, bearing means interposed between the top portion of said carrying saddle and the top portion of said tilt saddle, guide rollers rotatably mounted on each of said side walls of said tilt saddle, respectively, and disposed adjacent the upper ends thereof to engage said beam assembly, tilt rollers rotatably mounted on each of said side walls of said tilt saddle, respectively, and disposed adjacent the lower ends thereof and adapted to engage the sides of said beam assembly, and segmental bearing defining means on said side walls of said tilt saddle engaging segmental bearing defining means on said side walls of said carrying saddle, and disposed intermediate the upper and lower ends of said side walls, respectively.

2. The guiding and carrying means defined in claim 1, together with means resilient urging said guide rollers and said tilt rollers, respectively, against said beam assembly.

3. The guiding and carrying means defined in claim 1, and a vehicle body member carried on said tilt saddle, and rod means depending from said body member and slidably engageable with said side walls of said tilt saddle adjacent the lower ends of said side walls.

4. Guiding and carrying means for vehicles adapted to run on a beam assembly, said means comprising an elongated and inverted U-shape carrying frame, longitudinally spaced bearing means on said frame, load carrying wheels mounted rotatably in said bearings, vertically spaced guide means on each of the depending sides of said carrying frame, respectively, an inverted U-shape tilt frame seated astride said carrying frame and adapted to swivel thereon, vertically spaced guide means on each of the depending sides of said tilt frame, respectively, and bearing means on the depending sides of said carrying frame arranged cooperable with opposed bearing means on the depending sides of said tilt frame, and disposed intermediate said vertically spaced guide means on said depending sides, respectively.

5. The guiding and carrying means defined in claim 4, and a vehicle body member seated on said tilt frame and having depending members slidably engageable with said tilt frame depending sides, adjacent the lower ends of said sides.

6. Guiding and carrying means for vehicles adapted to run on a beam assembly, said means comprising an elongated and inverted U-shape carrying frame, longitudinally spaced bearing means on said frame, load-carrying wheels rotatably mounted in said bearing means, vertically spaced guide means on each of the depending sides of said frame, respectively, an inverted U-shape tilt frame seated astride said carrying frame and disposed thereon intermediate said spaced load-carrying wheels on said carrying frame, and mounted for swivelling movement on said carrying frame, vertically spaced guide means on the depending sides of said tilt frame, respectively, and adapted to extend through the depending sides of said carrying frame, and cooperating bearing members disposed on the depending side portions of said carrying frame and said tilt frame respectively.

7. Guiding and carrying means defined in claim 6, and a vehicle body member seated on said tilt frame and having depending members in spaced opposed relation to and externally of said depending sides of said tilt frame, a first slide bearing means on said depending sides of said tilt frame, respectively, and a second slide bearing means on said depending members and engageable with said first slide bearing means.

8. Guiding and carrying means for vehicles adapted to run on a beam assembly, said means comprising a first elongated inverted U-shape frame, longitudinally spaced bearing means on said frame, load carrying wheels mounted rotatable in said bearings, vertically spaced guide means on the depending sides of said first frame, a second inverted U-shape frame seated astride said first frame and mounted swivellably thereon, said second frame being disposed on said first frame in a position intermediate said spaced bearing means, vertically spaced guide means on the depending sides of said second frame, a vehicle body member seated on said second frame, means to transmit force incident to swivelling movement of said body member to said first frame, said means comprising depending members on said body member slidably engageable with depending side members of said second frame, and bearing means on said depending side members of said second frame in engagement with depending side members of said first frame.

9. Guiding and carrying means for vehicles adapted to run on a beam assembly, said means comprising a first elongated inverted U-shape frame, longitudinally spaced bearing means on said frame, load carrying wheels journalled in said bearings, vertically spaced guide means on the depending sides of said first frame, a second inverted U-shape frame seated astride said first frame, a convex bearing member on said first frame, a concave bearing member on said second frame and engaging said convex bearing member for supported movement of said second frame on said first frame, vertically spaced guide means on the depending sides of said second frame and enterable through the depending sides of said first frame, and means to transmit force incident to swivel movement of said second frame to said first frame, said means comprising cooperable segmental bearing means on the depending sides of said first and said second frames.

10. The guiding and carrying means defined in claim 9 and a vehicle body member seated on said second frame and means to transmit the forces incident to swivel movement of said body member to said first frame, said means comprising depending members on said body member slidably engageable with depending side members of said second frame and through said segmental bearing means on the depending sides of said first and said second frames, respectively.

11. Guiding and carrying means for vehicles adapted to run on a beam assembly, said means comprising a first elongated inverted U-shape frame, longitudinally spaced bearing means on said frame, load carrying wheels journalled in said bearing means, vertically spaced guide means on the depending sides of said first frame, a second inverted U-shape frame seated astride said first frame, and disposed on said first frame in a position between said longitudinally spaced bearing means, vertically spaced guide means on the depending sides of said second frame, a vehicle body member seated on said second frame, and having spaced opposed depending members slidably engageable with slide block means on said depending sides of said second frame and positioned adjacent the lower ends of said sides, and cooperable bearing means on spaced opposed depending sides of said first and said second frames and disposed in line with and above the position of said slide blocks on said depending sides of said second frame.

12. Guiding and carrying means for vehicles in a monorail system, said means comprising an elongated rectangular beam, a first elongated frame disposed straddling said beam, longitudinally spaced bearing means on said frame, load-carrying wheels mounted rotatable in said bearings, said frame having spaced opposed depending side members receiving said beam between them, spring urged guide means on said depending side members in engagement with said beam, a second elongated frame disposed straddling said first frame and having spaced opposed depending side members in spaced opposed relation to said side members of said first frame, bearing means interposed between said first frame and said second frame for swivelling motion of said second frame on said first frame about a center intermediate the top and bottom sides of said beam, spring urged guide means on said depending sides of said second frame in engagement with said beam, and bearing means on said depending sides of said first frame member in engagement with cooperable bearing means on said depending sides of said second member to transmit side forces experienced by said second frame to said beam independently of vertical forces experienced by said second frame.

13. Guiding and carrying means for vehicles in a monorail system, said means comprising an elongated beam, a first elongated frame disposed straddling said beam, load-carrying wheels on said frame in engagement with said beam, a second elongated frame seated on and straddling said first frame, a vehicle body seated on said second frame, and means including means mounted on each of said frames engageable with said beam to transmit side and tilt forces experienced by said vehicle body to spaced opposed sides of said beam independently of vertical load forces experienced by said vehicle body.

14. Guiding and carrying means for vehicles in a monorail system, an elongated rectangular beam, a first elongated frame, load-carrying wheels on said frame in engagement with said beam, a second elongated frame straddling said first frame, bearing means interposed between said first frame and said second frame for swivelling motion of said second frame on said first frame about a center intermediate the top and bottom sides of said beam, and means including rolls rotatably mounted on said frames and engageable with the vertical sides of said beam to transmit side and tilt forces experienced by said second frame to said vertical sides of said beam independently of vertical load forces experienced by said second frame.

15. Guiding and carrying means for vehicle in a monorail system comprising, a track of substantially rectangular section; a frame; load carrying wheels rotatably journalled in said frame and adapted to engage the upper surface of said track; guide rolls journalled in said frame and engageable with the opposite side faces of said track; and support structure resiliently connected to said vehicle, straddling said frame and said beam, and adapted to permit tilting movement of said vehicle with respect to said frame, to transmit vertical loads to said frame and to transmit lateral loads incident to tilting movement of said vehicle directly to said track.

References Cited in the file of this patent

UNITED STATES PATENTS

| | | |
|---|---|---|
| 395,073 | Paige | Dec. 25, 1888 |
| 609,784 | Capewell | Aug. 30, 1898 |
| 609,785 | Capewell | Aug. 30, 1898 |
| 918,661 | Davis | Apr. 20, 1909 |
| 1,091,853 | Lewis | Mar. 31, 1914 |